United States Patent
Denis

(10) Patent No.: US 6,481,557 B2
(45) Date of Patent: Nov. 19, 2002

(54) ADJUSTMENT MECHANISM

(75) Inventor: Christophe Denis, Athis de L'Orne (FR)

(73) Assignee: Faurecia Sieges d'Autmobile S.A., Boulogne (FR)

( * ) Notice: Subject to any disclaimer, the term of this patent is extended or adjusted under 35 U.S.C. 154(b) by 16 days.

(21) Appl. No.: 09/876,523

(22) Filed: Jun. 7, 2001

(65) Prior Publication Data

US 2002/0043849 A1 Apr. 18, 2002

(30) Foreign Application Priority Data

Jun. 8, 2000 (FR) .............................. 00 07336

(51) Int. Cl.$^7$ ................................................ B60N 2/16
(52) U.S. Cl. ......................... 192/223.2; 192/15; 192/19
(58) Field of Search ......................... 192/223.2, 15, 192/19; 74/142, 143, 126, 141.5, 88; 297/344.12

(56) References Cited

U.S. PATENT DOCUMENTS

| | | | | |
|---|---|---|---|---|
| 2,597,798 A | * | 5/1952 | Houplain | 192/223.2 |
| 5,794,479 A | * | 8/1998 | Schwarzbich | 192/223.2 |
| 5,881,854 A | * | 3/1999 | Rougnon-Glasson | 192/15 |
| 6,032,777 A | * | 3/2000 | Denis | 192/223.2 |
| 6,230,867 B1 | * | 5/2001 | Schwarzbich | 192/15 |
| 6,273,233 B1 | * | 8/2001 | Denis | 192/223.2 |

FOREIGN PATENT DOCUMENTS

| | | |
|---|---|---|
| DE | 37 34 363 | 4/1989 |
| DE | 44 28 557 | 4/1995 |
| EP | 0 631 901 | 1/1995 |

OTHER PUBLICATIONS

Search Report issued by the French Patent Office for parent French Application No. 00 07336 filed on Jun. 8, 2000; report dated Jan. 26, 2001.

* cited by examiner

*Primary Examiner*—Rodney H. Bonck
(74) *Attorney, Agent, or Firm*—Marshall, Gerstein & Borun

(57) ABSTRACT

An adjustment mechanism comprising a pivoting transmission member which surrounds an inlet member having three outwardly-directed projections. Between the inlet member and the bearing surface there are placed three springs urging wedging bodies towards the projections of the inlet member, and three fixed fingers. One of the fingers is of width sufficient to come into contact with the corresponding wedging bodies to prevent these bodies from wedging against the corresponding projections when the inlet member is in its rest position, while the other two fingers are of width that is small enough for the corresponding wedging bodies to then wedge against the corresponding projections.

6 Claims, 4 Drawing Sheets

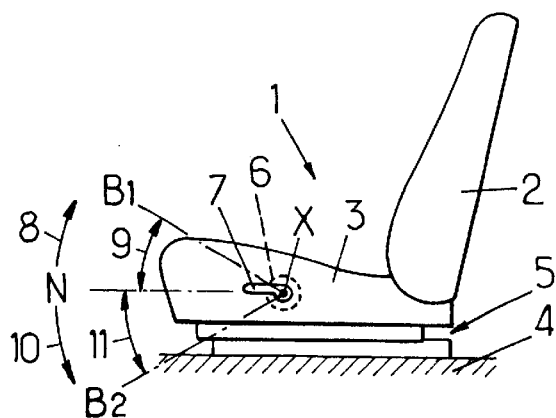
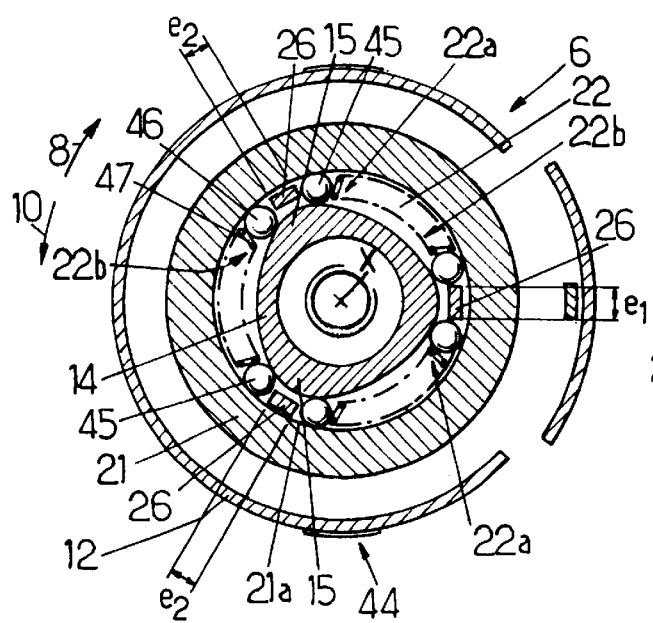
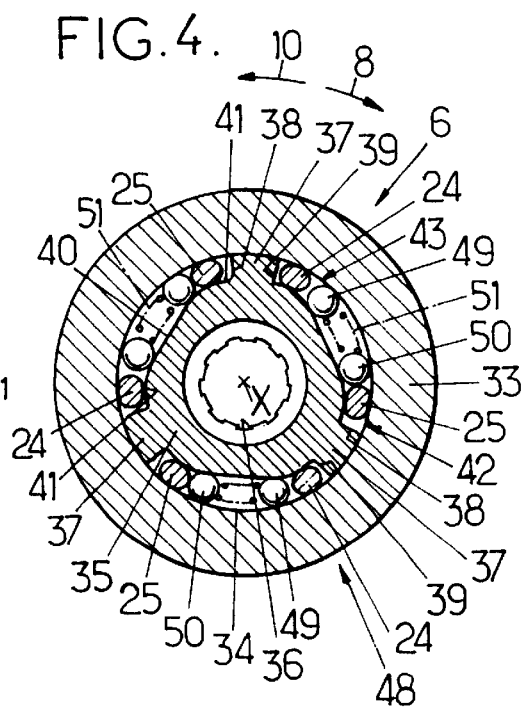

ADJUSTMENT MECHANISM

FIELD OF THE INVENTION

The present invention relates to adjustment mechanisms, in particular for vehicle seats.

More particularly, the invention relates to an adjustment mechanism comprising:
a fixed support;
an inlet member mounted to pivot relative to the support about a pivot axis, said inlet member being urged resiliently towards a rest position and being movable in a first angular direction from the rest position over a first angular sector, and in a second angular direction opposite to the first direction, from the rest position and over a second angular sector;
a transmission member mounted to turn about the pivot axis; and
a drive stage comprising:
a bearing surface secured to the transmission member, which bearing surface is in the form of a surface of revolution centered on the pivot axis and co-operates with the inlet member to define a hollow intermediate annular space, the inlet member having a plurality, n, of projections, where n is not less than 2, said projections projecting into said intermediate annular space and each defining first and second wedge-shaped zones in said intermediate annular space, said first and second wedge-shaped zones diverging respectively in the first and second angular directions;
n compression springs disposed in the intermediate annular space between the projections of the inlet member;
n pairs of wedging bodies corresponding respectively to the various projections of the inlet member and each comprising first and second rigid wedging bodies which are disposed in the intermediate annular space and which are urged towards the corresponding projections by two of said compression springs each bearing against the first wedging body of a pair of wedging bodies and against the second wedging body of an adjacent pair of wedging bodies, the first and second wedging bodies of the first pair thus being urged towards the first and second wedge-shaped zones defined by the first projection to tend to become wedged between said first projection and the bearing surface of the transmission member; and
n fixed fingers comprising at least first and second fingers, which are secured to the support and which are disposed in said intermediate annular space, the projections of the inlet member being disposed respectively in register with the fixed fingers when said inlet member is in its rest position, the fixed fingers comprising a first finger presenting width in a circumferential direction about the pivot axis sufficient for the two wedging bodies of the corresponding pair of wedging bodies to come into abutment against said first finger when the inlet member is in its rest position, such that the inlet member is urged towards its rest position by the first and second springs of the wedging bodies.

BACKGROUND OF THE INVENTION

Document EP-A-0 631 901 descries various examples of such adjustment mechanisms.

Mechanisms of this type make it possible to perform continuous adjustments on an element driven by an outlet member connected to the above-mentioned drive member, by performing one or more reciprocating "pumping" movements:
either over the first angular sector from the rest position of the inlet member in order to move the element driven by the outlet member in a certain direction;
or else over the second angular sector to move the element driven by the outlet member in the opposite direction.

By way of example, such mechanisms can be used in particular for adjusting the height of the seat proper of a vehicle seat.

In the above-mentioned document, the inlet member is urged towards its rest position by the springs of the drive stage. Nevertheless, in the rest position of the inlet member, all of the wedging bodies are theoretically in contact with the fixed fingers in the immediate vicinity of the projections on the inlet member, but given manufacturing tolerances:
either the wedging bodies come into contact with the projections of the inlet member and not with the fixed fingers when the inlet member is in the rest position, in which case there exists uncertainty concerning the exact rest position of the inlet member;
or else the wedging bodies come into contact with the fixed fingers and not with the projections when the inlet member is in the rest position, thereby giving it additional angular lost motion from its rest position before beginning to move the drive member.

OBJECTS AND SUMMARY OF THE INVENTION

A particular object of the present invention is to mitigate those drawbacks.

To this end, in the invention, an adjustment mechanism of the kind in question is characterized in that the first finger and the corresponding projection are so shaped that the corresponding wedging bodies come into abutment against said first finger, thereby preventing them from wedging between the corresponding projection and the bearing surface of the transmission member while the inlet member is in its rest position; and
in that the second finger and the corresponding projection are so shaped that said second finger does not interfere with the corresponding wedging bodies while the inlet member is in the rest position, these wedging bodies then wedging between the corresponding projection and the bearing surface of the transmission member.

By means of these dispositions, the first finger guarantees that the inlet member always returns into exactly the same rest position, while the additional fixed finger(s) guarantees that at least two of the wedging bodies are already wedged against the corresponding projections of the inlet member as soon as said inlet member is in its rest position but that when the inlet member is actuated, movement of the inlet member causes the drive member to begin moving immediately, substantially without any lost motion or with lost motion that is very small.

In preferred embodiments of the invention, use may optionally be made of one or more of the following dispositions:
the second finger presents width less than the width of the first finger, with the projections all being identical;
n is equal to 3, and the fixed fingers include a third finger which presents width small enough to ensure that said third finger does not interfere with the corresponding wedging bodies while the inlet member is in the rest position, these wedging bodies then wedging between the corresponding projection and the bearing surface of the transmission member;

the mechanism further comprises:

a locking surface secured to the support and in the form of a surface of revolution centered on the pivot axis;

an outlet member mounted to turn about the pivot axis and shaped to co-operate with the locking surface to define at least one pair of wedge-shaped spaces comprising first and second wedge-shaped spaces, these first and second wedge-shaped spaces diverging respectively in the first and second angular directions; and a locking stage connecting the transmission member to the outlet member, said locking stage comprising:

at least one pair of clamping bodies comprising first and second rigid clamping bodies which are disposed respectively in the first and second wedge-shaped spaces and which are urged resiliently respectively in the first and second angular directions to wedge between the outlet member and the locking surface;

at least first and second rigid abutment faces secured to the transmission member and oriented respectively in the first and second angular directions, the first abutment face being adapted to come into abutment against the first clamping body to release it when the transmission member turns in the first angular direction, and the second abutment face being adapted to come into abutment against the second clamping body to release it when the transmission member turns in the second angular direction, the first and second abutment faces presenting a certain amount of angular clearance relative to the first and second clamping bodies; and at least first and second thrust faces secured to the outlet member, the first thrust face being adapted to limit movement of the transmission member relative to the outlet member in the first angular direction after said first abutment face has moved the first clamping body far enough to release it, thus enabling said outlet member to be driven by the transmission member, and the second thrust face being adapted to limit movement of the transmission member relative to the outlet member in the second angular direction after said second abutment face has moved the second clamping body far enough to release it, so as to cause said outlet member to be driven by the transmission member;

the first and second clamping bodies of each pair of clamping bodies are urged mutually apart by a compression spring and are placed between a pair of axial fingers comprising first and second axial fingers secured to the transmission member, said first and second axial fingers respectively including the first and second abutment faces, the first thrust face of the outlet member being adapted to come into abutment against the second axial finger of the transmission member when said transmission member moves in the first angular direction, and the second thrust face of the outlet member being adapted to come into abutment against the first axial finger of the transmission member when said transmission member moves in the second angular direction; and the transmission member is braked relative to the outlet member by sufficient braking torque to keep the transmission member stationary during each return movement of the inlet member towards its rest position after the locking stage has locked, the resilient urging applied to the clamping bodies being sufficient to overcome said braking torque while the locking stage is being locked.

BRIEF DESCRIPTION OF THE DRAWINGS

Other characteristics and advantages of the invention will appear on reading the following description of an embodiment thereof given as a non-limiting example and described with reference to the accompanying drawings.

In the drawings:

FIG. 1 is a diagrammatic view of a vehicle seat in which the height of the seat proper is adjustable by means of an adjustment mechanism of the invention;

FIGS. 3 and 4 are fragmentary section views respectively on lines III—III and IV—IV of FIG. 2.

MORE DETAILED DESCRIPTION

Figure 2:
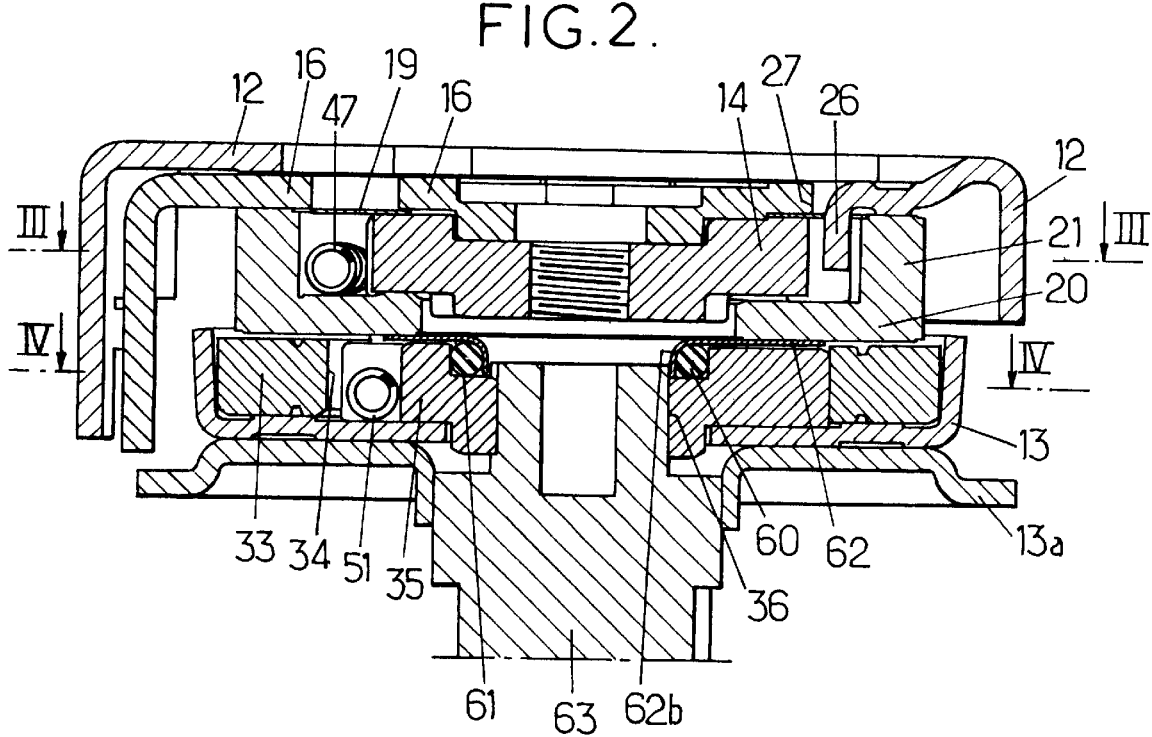
FIG. 2 is an axial section view of an adjustment mechanism constituting an embodiment of the invention and suitable for adjusting the height of the FIG. 1 seat.

In the figures, the same references are used to designate elements that are identical or similar.

FIG. 1 shows a vehicle seat comprising a back 2 carried by a seat proper 3, itself mounted on the floor 4 of the vehicle, e.g. by means of longitudinal runners 5.

The seat proper 3 is connected to the runners via a conventional raising mechanism (not shown) which enables the height of the seat proper 3 to be adjusted. This raising mechanism is driven by an irreversible adjustment mechanism 6, itself driven by a control lever 7 (or by a handle of some other shape) mounted to pivot about a transverse horizontal pivot axis X.

The lever 7 is urged resiliently towards a rest position N in which said lever can be in a substantially horizontal position, for example. Starting from this rest position, the lever 7 can be moved:

in a first angular direction 8 over a first angular sector 9 extending between the rest position N and a first abutment position B1; and in a second angular direction 10 over a second angular section 11 defined between the rest position N and a second abutment position B2.

Figure 5:
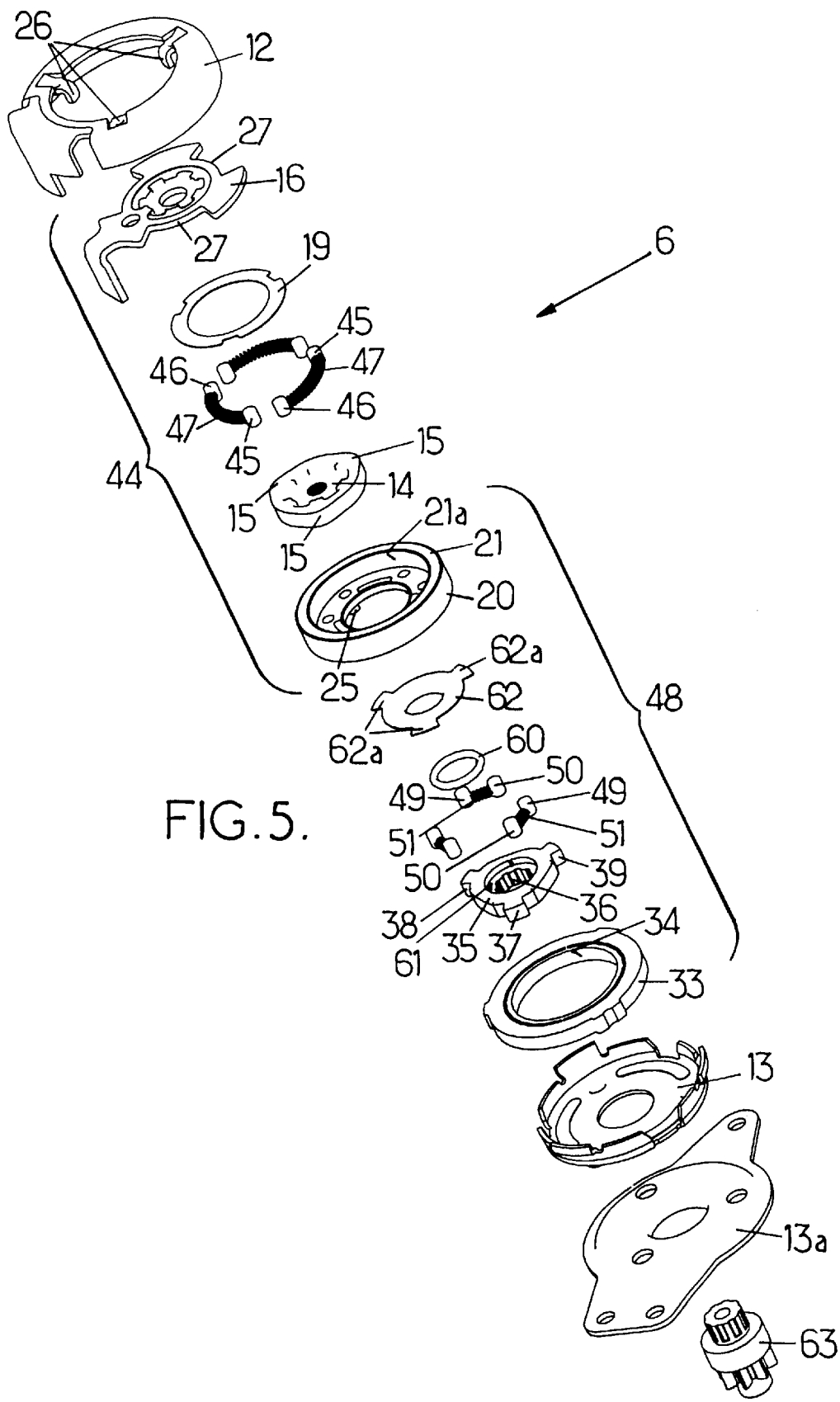
FIGS. 5 and 6 are exploded perspective views of the adjustment mechanism of FIG. 2, seen looking from two different angles.
Figure 6:
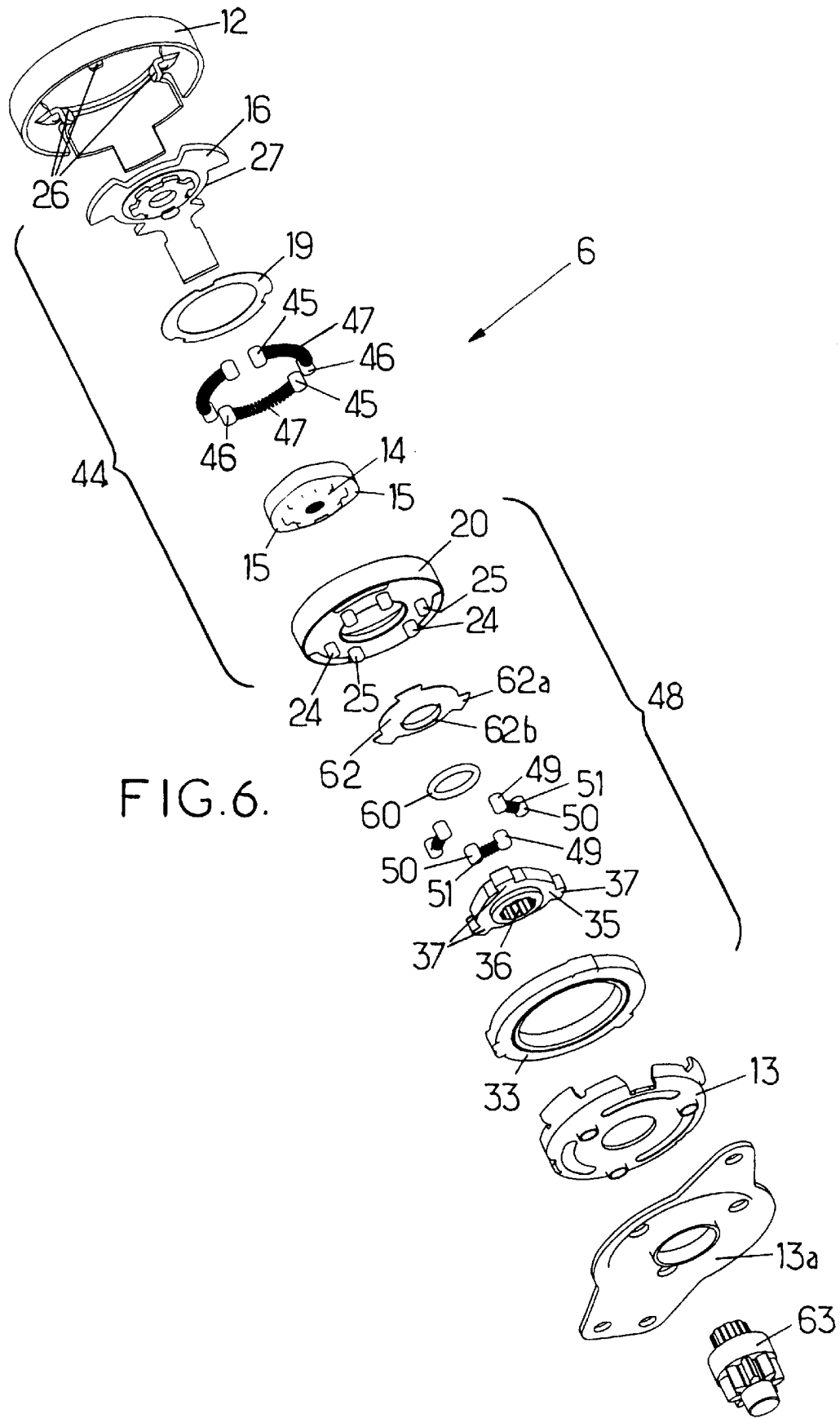

As shown in FIGS. 2 to 6, the irreversible adjustment mechanism 6 comprises a fixed support which, in the example shown, is a housing formed by two sheet metal shells 12 and 13 which are assembled together by welding or by some other means, and which are fixed to the structure of the seat proper 3 by screws, rivets, etc., for example.

Furthermore, the adjustment mechanism also comprises an inlet member 14 which can be an annular metal inlet cam of substantially triangular outside shape with rounded vertices constituting three projections 15 which project radially outwards (see FIG. 3).

By way of example, this inlet cam can be fixed to a radial sheet metal plate 16 (FIG. 2) which is adjacent to the shell 12 of the housing and which is secured to screws or rivets for fixing to the above-mentioned lever 7.

Furthermore, the adjustment mechanism 6 also has a transmission member 20 or driver comprising a metal ring 21 centered on the pivot axis X (FIG. 3). This ring 21 has an inside cylindrical surface or bearing cylindrical surface 21a that is a surface of revolution about the axis X, and said ring 21 is placed in contact with the metal plate 16.

The bearing cylindrical surface 21a co-operates radially with the inlet cam 14 to define an annular intermediate space 22 (see FIG. 3) which is covered by a thin metal washer 19 towards the plate 16 and which forms first and second wedge-shaped zones 22a and 22b on either side of each projection 15 on the inlet cam, the wedge-shaped zones diverging respectively in the first and second directions 8 and 10.

The transmission member 20 also has three pairs of axial fingers 24, 25 extending towards the shell 13 of the housing parallel to the axis X.

The annular intermediate space 22 receives three fixed axial fingers 26 which can be constituted in particular by tongues cut out in the shell 12 of the housing and folded towards the inside of said housing. The fixed fingers 26 pass through notches 27 formed in the above-mentioned metal plate 16. In the rest position of the inlet cam 14, its projections 15 are placed respectively in register with the three fixed axial fingers 26.

As shown in FIG. 4, the adjustment mechanism 6 also includes a fixed ring 33 secured to the shell 13 and in the form of an annulus centered on the axis X and having a cylindrical inside surface 34 or "locking" cylindrical surface which is a surface of revolution about said axis X.

An outlet member 35 or outlet cam is placed inside this fixed ring 33, the outlet cam having a central fluted hole 36 for a shaft 63 which drives the raising mechanism for adjusting the height of the seat.

In addition, the outside of the outlet cam 35 has three radial fingers 37 which project outwards to make contact with the locking cylindrical surface 34 and which are angularly distributed at 120° from one another.

Each finger 37 is defined laterally by first and second thrust faces 38 and 39 which face respectively in the second and first angular directions 10 and 8.

The periphery of the outlet cam also has three setback zones, each having a central flat 40 extended in the vicinity of two adjacent projecting fingers 37 by two rounded zones 41 in the form of circular arcs centered substantially on the axis X. Each flat 40 co-operates with the locking cylindrical surface 34 to define first and second wedge-shaped spaces 42 and 43 diverging respectively in the first and second angular directions 8 and 10.

The above-described mechanism 6 operates by means of:
  a drive stage 44 connecting the inlet cam 14 to the transmission member 20; and
  a locking stage 48 connecting the transmission member to the outlet cam 35.

As shown in FIG. 3, the drive stage 44 has three pairs of first and second rigid wedging bodies 45 and 46, and specifically steel wheels or balls, disposed respectively in the intermediate annular space 22 in each of the first and second wedge-shaped zones 22a, 22b situated on either side of each projection 15 of the inlet cam 14.

Between each first wedging body 45 and the second wedging body 46 corresponding to the adjacent projection 15 of the inlet cam, there is interposed a compression spring 47 which is also housed in the intermediate annular space 22 so as to urge the wedging bodies towards the wedge-shaped zones 22a, 22b.

Furthermore, one of the fixed fingers 26 presents a width e1 in the circumferential direction, which width is large enough for the two corresponding wedging bodies 45 and 46 to come into abutment against said finger without wedging in the wedge-shape zones 22a, 22b, while the other two fingers 26 are each of a width e2 less than e1 so that the corresponding wedging bodies 45 and 46 do not come into contact with these two fingers 26 but instead become locked in the wedge-shaped zones 22a, 22b. The difference between the widths e1 and e2 can be about 1 millimeter (mm) for example.

Thus, the two springs 47 on either side of the finger 26 of width e1 urge the lever 7 towards its rest position N, and guarantee that the lever 7 is accurately positioned in this rest position.

When the actuator lever 7 is moved in one or other angular directions 8, 10 away from its rest position N, the projections 15 of the inlet cam 14 lock the first wedging bodies 45 strongly against the bearing surface 21a if the lever is actuated in the first annular direction 8, and they lock the second wedging bodies 46 against the bearing surface 21a if the lever is actuated in the second angular direction 10. The inlet cam 14 then drives the transmission member 20 after the lever 7 has traveled through a very small amount of angular lost motion, said lost motion possibly being about 1°, for example. During this movement, every other wedging body remains in abutment against the fixed fingers 26. The small size of the above-mentioned lost motion is guaranteed by the fact that in the rest position N of the lever 7, four of the wedging bodies 45, 46 are wedged in the corresponding wedge-shaped zones 22a, 22b (as a minimum, it is necessary for at least two wedging bodies 45, 46 to be locked in the corresponding wedge-shaped zones 22a, 22b).

When the user releases the lever 7 after each actuation, said lever is returned to its rest position N by the springs 47 of the drive stage. During this return movement towards the rest position, the wedging bodies 45, 46 which have been moved by the inlet cam 14 returns towards their initial position together with said inlet cam, rubbing against the inside surface 21a of the ring 21. Nevertheless, this rubbing is advantageously prevented from generating any return movement of the transmission member 20 by means of a braking member 60, described below.

Furthermore, as shown in FIG. 4, the locking stage 48 has three pairs of first and second clamping bodies 49, 50 (e.g. steel wheels or balls) which are placed respectively in the first and second wedge-shaped spaces 42, 43 and which are mutually urged apart by compression springs 51 so that in the rest position, the clamping bodies 42, 43 prevent the outlet cam 35 from moving by wedging against the locking surface 34.

In addition, the first and second clamping bodies 49, 50 in each pair of clamping bodies 49, 50 located between two radial fingers 27 of the outlet cam lie between the two fingers of a first and second angular finger pair 24, 25 of the transmission member 20, while leaving a certain amount of angular clearance.

More precisely:
  each first axial finger 24 is placed between one of the first clamping bodies 49 and the corresponding second thrust face 39, said first finger 24 having a first abutment face suitable for moving the corresponding first clamping body; and
  each second axial finger 25 is placed between one of the second clamping bodies 50 and the corresponding first thrust face 38, said second finger 25 having a second abutment face suitable for moving the corresponding second clamping body.

In addition, the locking stage 48 can advantageously also include at least one braking member which can be constituted, for example, by a friction ring 60 made of elastomer or other substance, which generates a braking force by friction between the outlet cam 35 and the transmission member 20. Advantageously, this ring 60 is placed in a cylindrical housing 61 hollowed out in the face of the outlet cam 45 which faces towards the transmission member 20. In the example shown, this housing 61 and the ring 60 are covered by a thin metal sheet 62 which is prevented from rotating relative to the transmission member 20 by three radial fingers 62a of said sheet which are each engaged between two fingers 24, 25 of the transmission member 20.

Advantageously, the sheet 62 has a folded-down inner annular edge 62b which is engaged in the ring 60, thereby isolating said ring from the fluted shaft 63 engaged in the fluted hole 36 of the outlet cam.

The ring 60 generates braking torque on the transmission member 20 relative to the outlet cam 35, which torque can lie in the range 0.2 Newton meters (Nm) to 1 Nm, e.g. being about 0.5 Nm.

This prevents any involuntary movement of the transmission member 20.

It may be observed that the springs 51 are nevertheless strong enough to overcome the braking force generated by the ring 60, so as to allow the outlet cam 35 to lock automatically when the user ceases to actuate the mechanism.

When the lever 7 is actuated by the user to cause the transmission member 20 to pivot as explained above, e.g. in the second angular direction 10 starting from the rest position N (i.e. within the second angular sector 11), the abutment face of each finger 25 of the transmission member 20 moves one of the second clamping bodies 50 in the second angular direction 10, thereby unlocking said second clamping body.

During the first actuation of the lever 7 in the second angular sector 11 after said lever has been actuated in the first angular sector 9, contact between the finger 25 and the clamping body 50 occurs only after taking up a certain amount of angular lost motion due to the clearance between the fingers 24, 25 and the clamping bodies 49, 50.

After the second clamping bodies 50 have been unlocked, the first clamping bodies 49 urge the outlet cam 35 in the direction 10 under drive from the springs 51. This urging can possibly be sufficient to cause the outlet cam 35 to turn, particularly when the mechanism 6 is operating without any load, i.e. without any opposing torque.

In contrast, when the mechanism 6 is operating under load, the pivoting of the transmission member 20 does not give rise to rotation of the outlet cam 35 in the angular direction 10 until the first axial fingers 24 of the transmission member come into contact with the second thrusts 39 of the outlet cam, i.e. after the lever 7 has traveled over additional lost motion which can be about 2°, for example.

Because the transmission member 20 is held stationary relative to the outlet cam 35 by the ring 60 at the end of the lever 7 being actuated, the second axial fingers 25 then remain in contact with the second clamping bodies 50: if the user performs several "pumping" movements over the second angular sector 11, then the angular lost motion of the lever 7 at the beginning of each pumping movement is thus greatly reduced starting from the second movement, since it is then no longer necessary to take up the clearance between the fingers 24, 25 and the clamping bodies 49, 50. This is particularly advantageous when the shape of the fingers 26 also minimizes the angular lost motion in the drive stage 44.

The device operates in the same manner, mutatis mutandis, when the lever 7 is actuated respectively over the first angular sector 9.

I claim:

1. An adjustment mechanism comprising:

a fixed support;

an inlet member mounted to pivot relative to the support about a pivot axis, said inlet member being urged resiliently towards a rest position and being movable in a first angular direction from the rest position over a first angular sector, and in a second angular direction opposite to the first direction, from the rest position and over a second angular sector;

a transmission member mounted to turn about the pivot axis; and a drive stage comprising:
  a bearing surface secured to the transmission member, which bearing surface is in the form of a surface of revolution centered on the pivot axis and co-operates with the inlet member to define a hollow intermediate annular space, the inlet member having a plurality, n, of projections, where n is not less than 2, said projections projecting into said intermediate annular space and each defining first and second wedge-shaped zones in said intermediate annular space, said first and second wedge-shaped zones diverging respectively in the first and second angular directions;
  n compression springs disposed in the intermediate annular space between the projections of the inlet member;
  n pairs of wedging bodies corresponding respectively to the various projections of the inlet member and each comprising first and second rigid wedging bodies which are disposed in the intermediate annular space and which are urged towards the corresponding projections by two of said compression springs each bearing against the first wedging body of a pair of wedging bodies and against the second wedging body of an adjacent pair of wedging bodies, the first and second wedging bodies of the first pair thus being urged towards the first and second wedge-shaped zones defined by the first projection to tend to become wedged between said first projection and the bearing surface of the transmission member; and
  n fixed fingers comprising at least first and second fingers, which are secured to the support and which are disposed in said intermediate annular space, the projections of the inlet member being disposed respectively in register with the fixed fingers when said inlet member is in its rest position, the fixed fingers comprising a first finger presenting width in a circumferential direction about the pivot axis sufficient for the two wedging bodies of the corresponding pair of wedging bodies to come into abutment against said first finger when the inlet member is in its rest position, such that the inlet member is urged towards its rest position by the first and second springs of the wedging bodies;

wherein the first finger and the corresponding projection are so shaped that the corresponding wedging bodies come into abutment against said first finger, thereby preventing them from wedging between the corresponding projection and the bearing surface of the transmission member while the inlet member is in its rest position; and wherein the second finger and the corresponding projection are so shaped that said second finger does not interfere with the corresponding wedging bodies while the inlet member is in the rest position, these wedging bodies then wedging between the corresponding projection and the bearing surface of the transmission member.

2. An adjustment mechanism according to claim 1, in which the second finger presents width less than the width of the first finger, with the projections all being identical.

3. An adjustment mechanism according to claim 1, in which n is equal to 3, and the fixed fingers include a third finger which presents width small enough to ensure that said third finger does not interfere with the corresponding wedging bodies while the inlet member is in the rest position, these wedging bodies then wedging between the corresponding projection and the bearing surface of the transmission member.

4. An adjustment mechanism according to claim 1, further comprising:

a locking surface secured to the support and in the form of a surface of revolution centered on the pivot axis;

an outlet member mounted to turn about the pivot axis and shaped to co-operate with the locking surface to define at least one pair of wedge-shaped spaces comprising first and second wedge-shaped spaces, these first and second wedge-shaped spaces diverging respectively in the first and second angular directions; and a locking stage connecting the transmission member to the outlet member, said locking stage comprising:

at least one pair of clamping bodies comprising first and second rigid clamping bodies which are disposed respectively in the first and second wedge-shaped spaces and which are urged resiliently respectively in the first and second angular directions to wedge between the outlet member and the locking surface;

at least first and second rigid abutment faces secured to the transmission member and oriented respectively in the first and second angular directions, the first abutment face being adapted to come into abutment against the first clamping body to release it when the transmission member turns in the first angular direction, and the second abutment face being adapted to come into abutment against the second clamping body to release it when the transmission member turns in the second angular direction, the first and second abutment faces presenting a certain amount of angular clearance relative to the first and second clamping bodies; and at least first and second thrust faces secured to the outlet member, the first thrust face being adapted to limit movement of the transmission member relative to the outlet member in the first angular direction after said first abutment face has moved the first clamping body far enough to release it, thus enabling said outlet member to be driven by the transmission member, and the second thrust face being adapted to limit movement of the transmission member relative to the outlet member in the second angular direction after said second abutment face has moved the second clamping body far enough to release it, so as to cause said outlet member to be driven by the transmission member.

5. An adjustment mechanism according to claim 4, in which the first and second clamping bodies of each pair of clamping bodies are urged mutually apart by a compression spring and are placed between a pair of axial fingers comprising first and second axial fingers secured to the transmission member, said first and second axial fingers respectively including the first and second abutment faces, the first thrust face of the outlet member being adapted to come into abutment against the second axial finger of the transmission member when said transmission member moves in the first angular direction, and the second thrust face of the outlet member being adapted to come into abutment against the first axial finger of the transmission member when said transmission member moves in the second angular direction.

6. A mechanism according to claim 4, in which the transmission member is braked relative to the outlet member by sufficient braking torque to keep the transmission member stationary during each return movement of the inlet member towards its rest position after the locking stage has locked, the resilient urging applied to the clamping bodies being sufficient to overcome said braking torque while the locking stage is being locked.

* * * * *